Dec. 4, 1962 O. S. BROWN 3,066,835
APPARATUS FOR DISPENSING PREDETERMINED QUANTITIES
OF GRANULAR MATERIAL
Filed Dec. 23, 1959 5 Sheets-Sheet 5

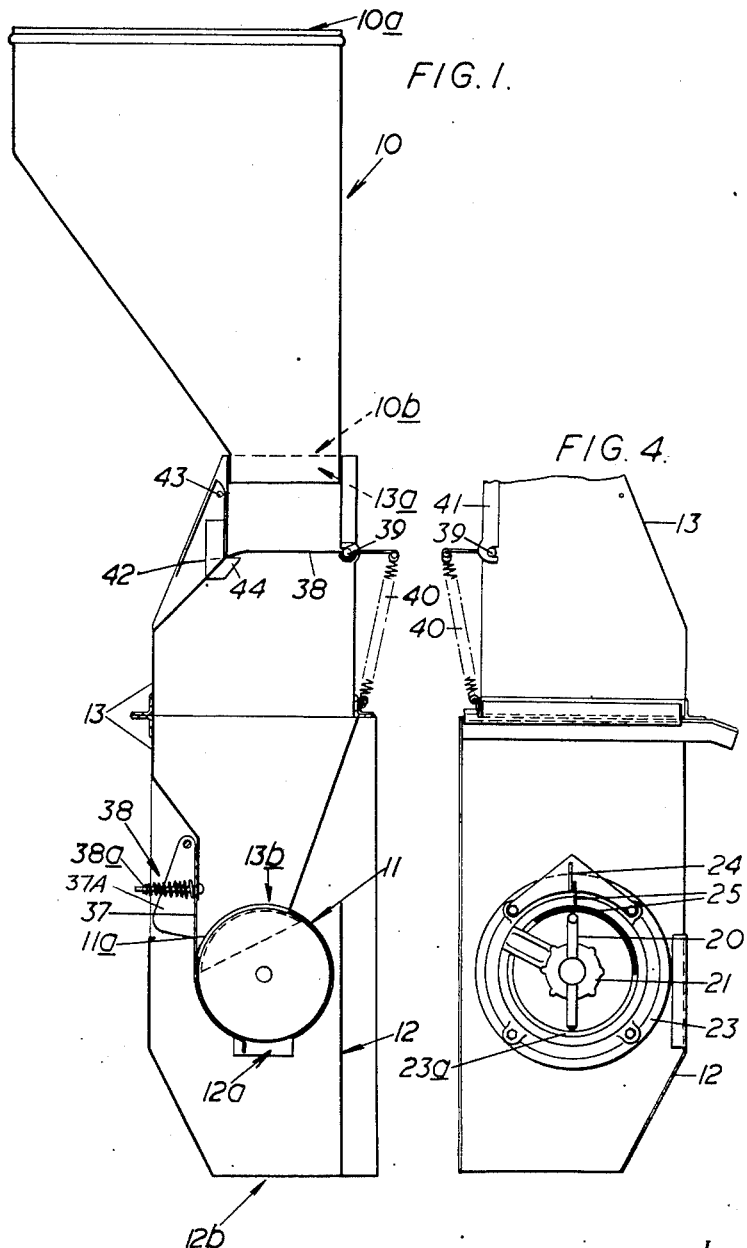

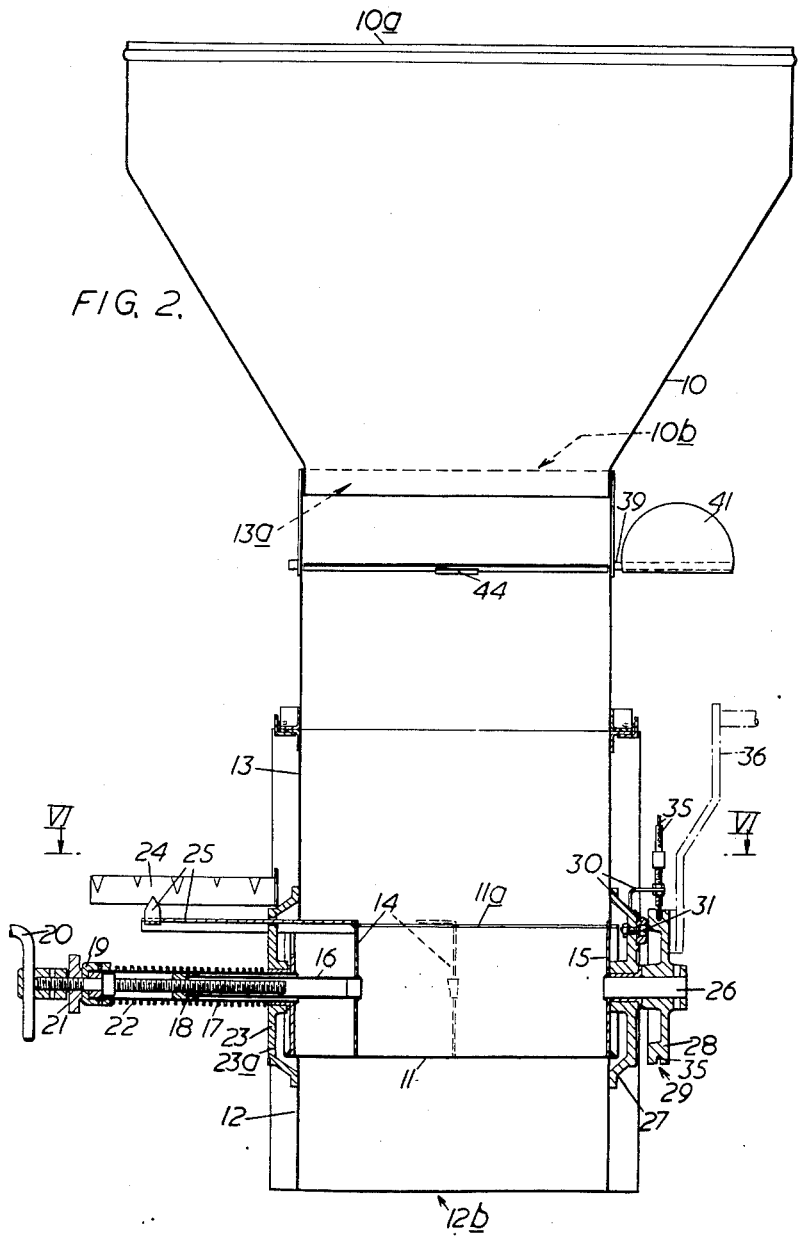

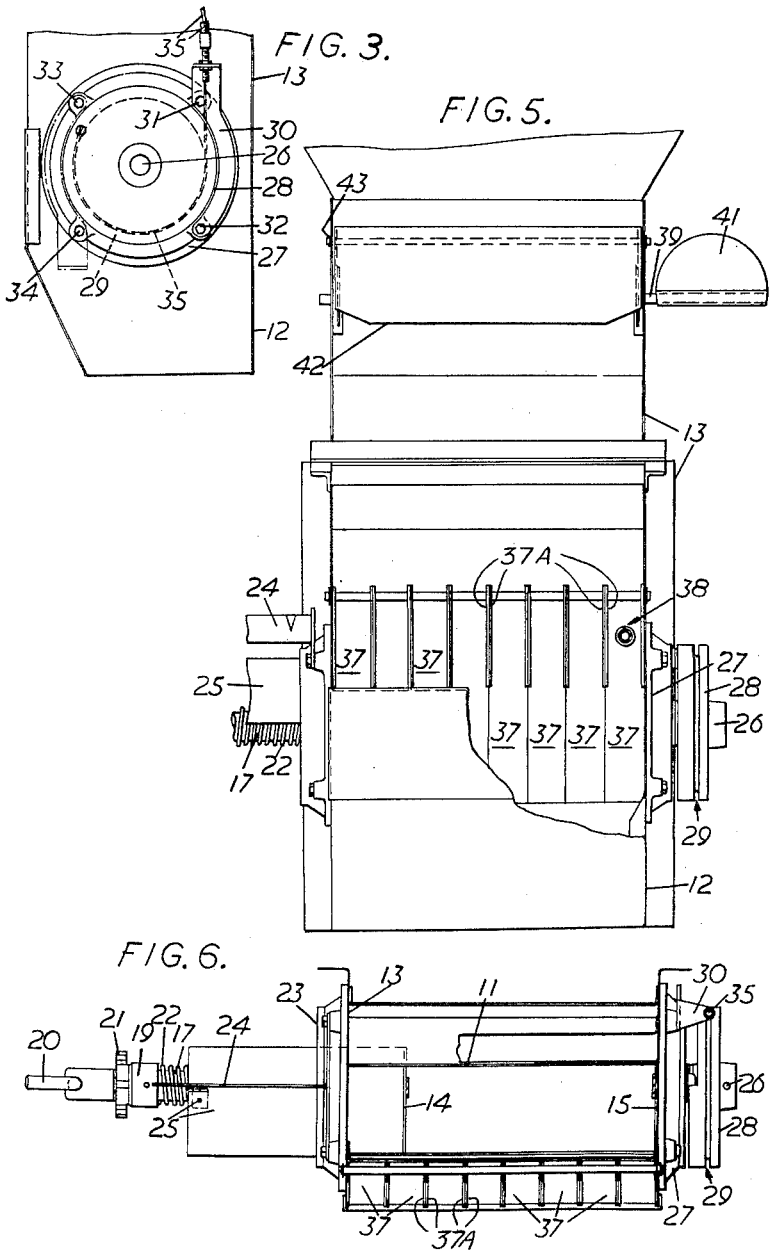

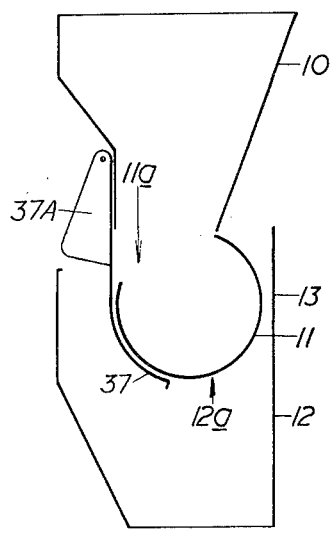
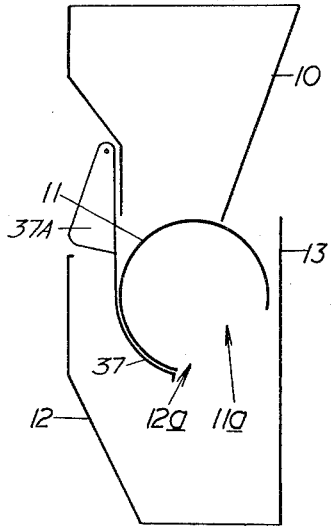
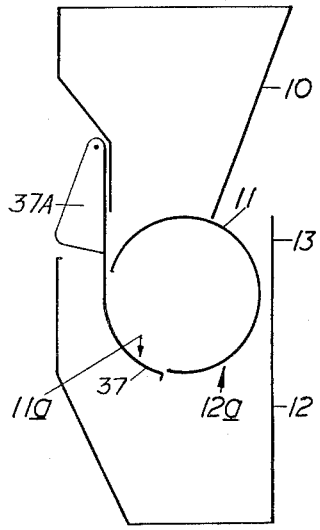

Inventor
ORBY SHACKLETON BROWN

By
Mason, Fenwick & Lawrence
Attorneys

United States Patent Office 3,066,835
Patented Dec. 4, 1962

3,066,835
APPARATUS FOR DISPENSING PREDETERMINED QUANTITIES OF GRANULAR MATERIAL
Orby Shackelton Brown, Laurelvale, Tandragee, Armagh, Northern Ireland, assignor of one-half to Air Conditioning and Engineering (N.I.) Limited, Laurelvale, Northern Ireland, a British company
Filed Dec. 23, 1959, Ser. No. 861,582
Claims priority, application Great Britain Jan. 10, 1959
5 Claims. (Cl. 222—308)

This invention relates to apparatus for dispensing predetermined quantities of fluent material, for example granular material.

The present invention is especially but not exclusively applicable to dispensing predetermined quantities of animal foodstuffs, for example, meal, nuts and other foodstuffs.

The present invention is apparatus for dispensing predetermined quantities of fluent material, the apparatus comprising a supply container having a material outlet, a dispensing chute having a material inlet, a rotary chamber of known internal volume disposed between the supply container and the dispensing chute and formed with an opening in its wall to register with the container outlet to receive a quantity of fluent material from the container, and with the chute inlet to deliver the quantity of fluent material to the chute, and a housing for the chamber, the wall of the housing adjacent the chamber opening during rotation of the chamber from the container outlet to the chute inlet consisting of a series of side-by-side resilient fingers arranged in a row extending the length of the chamber so as to prevent granular material from jamming between the chamber wall and the housing wall during rotation of the chamber.

Figure 8:
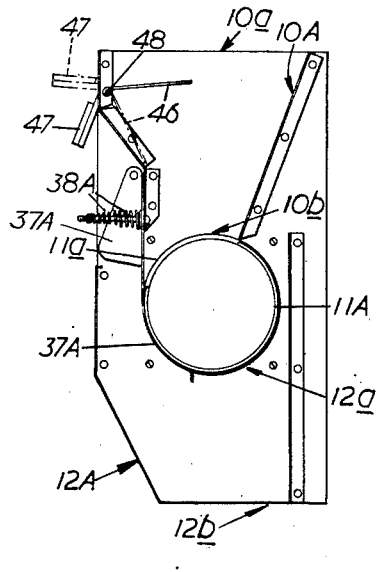
Figure 9:
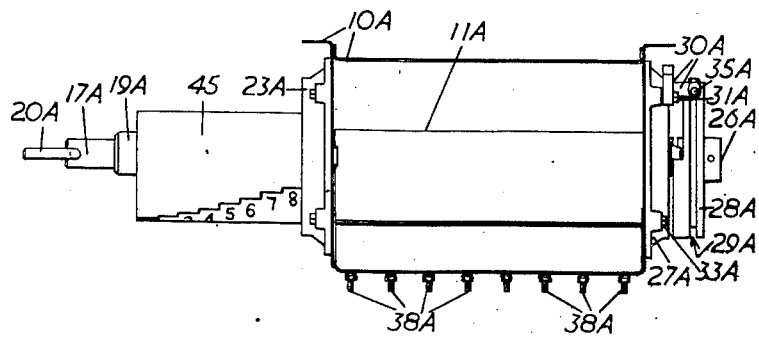

An example of the present invention will now be described with reference to the accompanying drawings, in which:

FIG. 1 is a side sectional view of the dispensing apparatus according to the present invention, FIG. 2 is a front sectional view, FIGS. 3 and 4 are fragmentary end elevations from opposite ends, FIG. 5 is a fragmentary front elevation, FIG. 6 is a section on the line VI—VI of FIG. 2, FIGS. 7, 7a and 7b are diagrammatic views showing the rotation, and FIGS. 8 and 9 are respectively a side sectional view and a sectional plan view of a modified dispensing apparatus.

The dispensing apparatus is preferably for use in supplying predetermined quantities of animal foodstuffs to a trough (not shown). The foodstuffs may be meal, oil cake, nuts or fodder or mixtures thereof.

Referring to FIGS. 1 to 7b of the drawings, the dispensing apparatus comprises a supply hopper 10, a chamber 11 of known but variable internal diameter, and a dispensing nozzle or chute 12. The components are preferably formed of sheet metal.

The hopper 10 may be of any suitable construction provided with a top inlet 10a and a bottom outlet 10b; and similarly the dispensing nozzle or chute 12 may be of any suitable construction provided with a top inlet 12a and bottom outlet 12b, the chute outlet 12b being directed to the receiving trough (not shown). The hopper 10 is in communication with a subsidiary hopper 13 disposed between the hopper 10 and chamber 11, the subsidiary hopper 13 having an inlet 13a and an outlet 13b.

The chamber 11 is disposed in a housing between the subsidiary hopper 13 and chute 12 and is oscillatory. The chamber 11 is of circular construction save for a segment 11a cut out along the length thereof. This slot 11a serves as both inlet and outlet of the chamber 11. The ends of the chamber 11 are closed by a pair of end closure members 14, 15 whereof the closure member 15 is fixed while closure member 14 can be moved towards or away from closure member 15 to vary the internal volume of the chamber 11 (see FIG. 2). It is to be appreciated that both closure members 14 and 15 may be movable towards or away from each other to vary said internal volume, and for this purpose, the closure members may be mounted on a rod having at one end a right-handed screw-thread and at the other a left-handed screw-thread, and a manual control wheel mounted on one end of the rod.

In the example shown, however, the end closure member 14 has integral therewith a hollow, outwardly-projecting tube 16 screw-threaded internally, and disposed within a fixed hollow tube 17 of larger diameter and integral with the chamber 11. A screw-threaded rod 18 projects into the tube 16 and is rotatably supported in a bearing 19 carried by the fixed tube 17. A handle 20 is provided at the outer end of the rod 18, and a locking nut 21 screw-engaged on said rod 18, a return torsion spring 22 is connected between the bearing 19 and an inverted saucer-shaped bearing 23 secured to the side of the subsidiary hopper 13 and chute 12. The bearing 23 is formed with an arcuate slot 23a to permit rotation of the chamber 11. Suitable washers (not shown) may be disposed inside the bearing 23 to prevent egress of the material in the apparatus out of the slot 23a. The tension of spring 22 can be adjusted if desired. An indicator plate 24 is attached to the side of the subsidiary hopper 13 and is marked off in equal weight divisions so that the internal volume of the chamber 11 can be varied to known values. An indicator pointer 25 is attached to movable end closure member 14 and projects through the slot 23a.

The arrangement is such that actuation of the handle 20 rotates the rod 18 and tube 19 to move the end closure member 14 to the value of internal volume required.

Suitable means is provided for turning the chamber 11 from a position in which the slot 11a registers with the subsidiary hopper outlet 13b to a position in which it registers with the chute inlet 12a. The end closure member 15 has integral therewith a shaft 26 rotatably mounted in an inverted saucer-shaped bearing 27 similar to the bearing 23 and fixed to the other side of the subsidiary hopper 13 and chute 12. A control member 28 having a peripheral channel or groove 29 is fixedly secured to the shaft 26. An arcuate connecting member 30 is secured to the bearing 27 by bolts 31, 32. The bearing 27 has two further mounting bolts 33, 34 and the arcuate connecting member 30 can be mounted horizontally or vertically between any two of bolts 31 to 34. A coaxial Bowden cable 35 is fitted to arcuate member 30, the control cable passing down into channel 29 whereat it is attached to control member 28. The Bowden cable 35 can be remote controlled. It will be appreciated that due to the possible various positions of the arcuate member 30 the Bowden cable can be pulled in the most convenient direction.

The arrangement is such that actuation of the Bowden cable 35 rotates control member 28 and shaft 26 and turns the chamber 11 from the position in which it registers with subsidiary hopper outlet 13b to a position in which it registers with chute inlet 12a. On release of the Bowden cable 35, the spring 22 returns the chamber 11 and its associated parts to the position shown in FIG. 1. The spring 22 is not only a return spring but serves also to maintain the chamber 11 in the position shown in FIG. 1. Reference to FIGS. 7 to 7b shows the movement of the chamber 11 from its material-receiving position (FIG. 7) to its material-dispensing position (FIG. 7b), and it is to be noted that in its intermediate position (FIG. 7a) the chamber 11 does not communicate either with outlet 13b or inlet 12a. The chamber 11 thus is oscillated by the Bowden cable 35 and the spring 22, i.e. its path of movement from its material-receiving position and its return path thereto are the same.

Alternative chamber rotating means may be provided such for example as a crank handle 36 as shown in dotted lines.

The wall of the chamber 11 adjacent the chamber opening 11a during rotation of the latter from the hopper outlet 10b to the chute inlet 12a (see FIGS. 7 to 7b) is formed of a series of side-by-side fingers 37 arranged in a row extending the length of the chamber 11. The fingers 37 are curved to conform with the configuration of the chamber 11 and are attached by bolts, and are spring-urged at their tops as indicated at 38 towards the bottom of the hopper. These fingers 37 serve to prevent granular material from jamming between the chamber wall and the housing wall during rotation of the chamber 11. The spring pressure on the fingers 37 can be manually adjusted by rotating nuts 38a screw-engaging the bolts.

It will be appreciated that the fingers 37 may be inherently resilient, and may be integral with a plate extending the length of the chamber 11 and secured to the hopper 10. In this case, the springs 38, bolts and nuts 38a are omitted.

Each finger 37 as can clearly be seen is pivoted above the chamber 11 and curves under the chamber 11 so that the fingers 37 serve not only to prevent jamming but also to mount the chamber 11 in position.

Each finger is provided at its top at each side with an outwardly-directed wing portion 37A, and adjacent wing portions 37A of adjacent fingers 37 are disposed in slidable contiguous relationship so that when a finger or fingers give or yield there is no egress of material from the subsidiary hopper 13.

A visual indicator mechanism is provided adjacent the subsidiary hopper inlet 13a to indicate when the hoppers 10, 13 require replenishing.

The indicator mechanism comprises a valve plate 38 pivoted intermediate its ends at 39, its rear end being connected to the hopper casing by a spring 40 which tends to pull said rear end downwards. A "Refill Hopper" plate 41 is carried by the pivot 39 and is movable between a horizontal position (not shown) when the hoppers are filled and a vertical position (FIG. 5) when the hoppers require replenishing. A manually-operable actuating plate 42 is pivoted at 43 at the front of subsidiary hopper 13 and has a catch 44 for engaging the front end of valve plate 38. In the position shown in FIG. 1, hopper 10 is full but subsidiary hopper 13 is empty and the plate 41 is in its vertical position. To fill subsidiary hopper 13 the actuating plate 42 is manually pivoted upwardly to disengage the catch 44 from the valve plate 38 and the weight of the contents in hopper 10 pivots the valve plate 38 downwards against the action of the spring 40 and the plate 38 is maintained in this position by the contents of subsidiary hopper 13. Indicator plate 41 is now horizontal, but when the contents of subsidiary hopper 13 fall below a predetermined amount, the spring 40 returns the valve plate 38 to its horizontal position thus indicating that replenishment is required.

The actuating plate 42 may be operated by any suitable mechanical, electrical, hydraulic or pneumatic means, for example it may be solenoid operated under the control of time switches.

In use, the subsidiary hopper 13 is filled with, for example, a mixture of meal and oil cake, the slot 11a in the chamber 11 registering with the hopper outlet 13b and the internal volume of the chamber 11 being pre-set as aforesaid. The meal and oil cake fall into the chamber 11 until it is full, whereupon a worker actuates the Bowden cable 35 to turn the chamber through 180° and permit the quantity of meal and oil cake to fall into the dispensing chute 12 and then to a receiving trough (not shown). The return spring 22 then turns the chamber 11 back over said path of 180° to its original position and allows it to fill up once again this return movement of the chamber 11 serving to release any pieces or granular material jammed between the chamber wall and a finger or fingers.

If a large lump of oil cake tends to jam the chamber 11 at the beginning of its rotation the adjacent finger or fingers 37 yield thereby permitting movement of the chamber. It is important to note that, due to the fact that only one or two fingers 37 yield when jamming occurs, the amount of fluent material which will escape when the finger or fingers open is almost negligible.

Referring now to FIGS. 8 and 9, the dispensing apparatus is substantially similar to that abovedescribed and like parts are referred to by the same reference numerals with the addition of the suffix letter "A."

In this construction, however, no subsidiary hopper 13 is provided.

The means for indicating the internal volume of the chamber 11 comprises a plate 45 attached to the top of end cap 14A and marked off in equal divisions.

The visual indicator mechanism for giving an indication of the amount of foodstuffs in the hopper 10A comprises a flexible member 46 inside the hopper 10A and rigid with an indicator member 47 outside the hopper 10A, both members 46 and 47 being pivoted at 48. When the hopper 10A is full, members 46 and 47 take up the positions shown in dotted lines, while when the hopper is empty or nearly so they take up the positions shown in full lines.

A series of dispensing apparatus may be provided for a series of troughs, one for each trough, and a supply line or ducting may be directed to each hopper from a main supply location.

With the present invention, an animal can be fed to the farmer's requirements and once the chamber volume has been set no other measuring is required.

The chamber 11 may instead of being manually rotated be power driven.

The hoppers 10, 10A and 13 may be of any suitable shape and dimensions.

The chamber 11 may be returned by means other than spring means.

A vibrating mechanism may be arranged in the hopper or ducting to keep the material therein fluent.

Various modifications may be made without departing from the scope of the present invention as defined in the accompanying claims.

I claim:

1. Apparatus for dispensing predetermined quantities of fluent granular material, the apparatus comprising a supply container having a material outlet, a dispensing chute having a material inlet, an oscillatory chamber of known internal volume disposed between the supply chamber and the dispensing chute and formed with an opening in its wall for registration with the container outlet to receive a quantity of material from the container, and with the chute inlet to deliver the quantity of material to the chute, a housing for the chamber, the wall of the housing adjacent the chamber opening during oscillatory movement of the chamber between its material-receiving and material-delivering positions consisting of a series of side-by-side resilient fingers arranged in a row extending the length of the chamber and the fingers extending from a position above the chamber and curving underneath the chamber and being connected to the supply container so as to be movable away from the chamber to prevent granular material from jamming between the chamber wall and said housing wall during oscillatory movement of the chamber, and an outwardly-directed wing portion at each side of the top of each finger, adjacent wing portions being slidably contiguous to prevent egress of material from the supply container when a finger moves.

2. Apparatus for dispensing predetermined quantities of fluent granular material, the apparatus comprising a supply container having a material outlet, a dispensing chute having a material inlet, an oscillatory chamber of known internal volume disposed between the supply container and the dispensing chute and formed with an opening in its wall for registration with the container outlet to receive a quantity of material from the container and with the chute inlet to deliver the quantity of material to the chute, a housing for the chamber, the wall of the housing adjacent the chamber opening during oscillatory movement of the chamber from the container outlet to the chute inlet consisting of a series of side-by-side resilient fingers arranged in a row extending the length of the chamber so as to prevent material from jamming between the chamber wall and said housing wall during oscillatory movement of the chamber, and an outwardly-directed wing portion at each side of the top of each finger, adjacent wing portions being slidably contiguous to prevent egress of material from the supply container when a finger is moved.

3. Apparatus for dispensing predetermined quantities of fluent granular material, the apparatus comprising a supply container having a material outlet, a dispensing chute having a material inlet, an oscillatory chamber of known internal volume disposed between the supply container and the dispensing chute and formed with an opening in its wall for registration with the container outlet to receive a quantity of material from the container and with the chute inlet to deliver the quantity of material to the chute, means associated with the oscillatory chamber for varying the internal volume of the chamber, a housing for the chamber, the wall of the housing adjacent the chamber opening during oscillatory movement of the chamber from the container outlet to the chute inlet consisting of a series of side-by-side resilient fingers arranged in a row extending the length of the chamber so as to prevent material from jamming between the chamber wall and said housing wall during oscillatory movement of the chamber, and an outwardly-directed wing portion at each side of the top of each finger, adjacent wing portions being slidably contiguous to prevent egress of material from the supply container when a finger is moved.

4. Apparatus for dispensing predetermined quantities of fluent granular material, the apparatus comprising a supply container having a material outlet, a dispensing chute having a material inlet, an oscillatory chamber of known internal volume disposed between the supply container and the dispensing chute and formed with an opening in its wall for registration with the container outlet to receive a quantity of material from the container and with the chute inlet to deliver the quantity of material to the chute, means associated with the oscillatory chamber for varying the internal volume of the chamber, a housing for the chamber, the wall of the housing adjacent the chamber opening during oscillatory movement of the chamber from the container outlet to the chute inlet consisting of a series of side-by-side resilient fingers arranged in a row extending the length of the chamber so as to prevent material from jamming between the chamber wall and said housing wall during oscillatory movement of the chamber, an outwardly-directed wing portion at each side of the top of each finger, adjacent wing portions being slidably contiguous to prevent egress of material from the supply container when a finger is moved, and means connected to the chamber for moving it from its material-receiving position to its material-delivering position.

5. Apparatus for dispensing predetermined quantities of fluent granular material, the apparatus comprising a supply container having a material outlet, a dispensing chute having a material inlet, an oscillatory chamber of known internal volume disposed between the supply container and the dispensing chute and formed with an opening in its wall for registration with the container outlet to receive a quantity of material from the container and with the chute inlet to deliver the quantity of material to the chute, means associated with the oscillatory chamber for varying the internal volume of the chamber, a housing for the chamber, the wall of the housing adjacent the chamber opening during oscillatory movement of the chamber from the container outlet to the chute inlet consisting of a series of side-by-side resilient fingers arranged in a row extending the length of the chamber so as to prevent material from jamming between the chamber wall and said housing wall during oscillatory movement of the chamber, an outwardly-directed wing portion at each side of the top of each finger, adjacent wing portions being slidably contiguous to prevent egress of material from the supply container when a finger is moved, means connected to the chamber for moving it from its material-receiving position to its material-delivering position, and spring means connected between the housing and chamber for maintaining the chamber in its material-receiving position, and returning it from its material-delivering position to its material-receiving position.

References Cited in the file of this patent

UNITED STATES PATENTS

| | | |
|---|---|---|
| 1,619,687 | Wodke | Mar. 1, 1927 |
| 1,984,950 | Steen | Dec. 18, 1934 |
| 2,064,719 | Baldwin | Dec. 15, 1936 |
| 2,135,665 | Hoban | Nov. 8, 1938 |
| 2,339,908 | Brewer et al. | Jan. 25, 1944 |
| 2,577,036 | Roebuck et al. | Dec. 4, 1951 |

FOREIGN PATENTS

| | | |
|---|---|---|
| 5,058 | Australia | Sept. 27, 1932 |